United States Patent [19]
Mori

[11] 4,390,252
[45] Jun. 28, 1983

[54] GAUSS TYPE PHOTOGRAPHIC LENS
[75] Inventor: Ikuo Mori, Kawasaki, Japan
[73] Assignee: Nippon Kogaku K. K., Tokyo, Japan
[21] Appl. No.: 171,003
[22] Filed: Jul. 18, 1980
[30] Foreign Application Priority Data
Aug. 10, 1979 [JP]   Japan ............................... 54-101976
[51] Int. Cl.$^3$ ................................................ G02B 9/36
[52] U.S. Cl. ..................................... 350/471; 350/255
[58] Field of Search ........................ 350/471, 431, 255
[56] References Cited
U.S. PATENT DOCUMENTS 1,463,132  7/1923  Graf ..................................... 350/255
2,503,789  4/1950  Wood et al. ......................... 350/255

Primary Examiner—Vincent P. McGraw
Assistant Examiner—Rebecca D. Gass
Attorney, Agent, or Firm—Shapiro and Shapiro

[57] ABSTRACT

A Gauss type photographic lens comprises, in succession from the object side, a first group including a positive lens component, a second group including a positive lens and a negative lens and having a negative refractive power as a whole, a third group including a meniscus lens component comprising a negative lens and a positive lens cemented together and having its concave surface facing the object side, and a fourth group including a positive lens component. The lens component in said fourth group is movable along the optical axis and the focusing is accomplished only by movement of said movable lens.

5 Claims, 11 Drawing Figures

GAUSS TYPE PHOTOGRAPHIC LENS

BACKGROUND OF THE INVENTION

1. Field of the Invention

This invention relates to a Gauss type photographic lens, and particularly to improvements in the focusing system thereof.

2. Description of the Prior Art

Generally, the focusing of a photographic lens is accomplished by the so-called whole axial movement system which requires the movement of the whole lens system. However, according to this system, the whole lens system, which is a mass of great weight, is moved. This has led to a complex and bulky construction of the lens barrel and also to difficulties both in portability and operability.

SUMMARY OF THE INVENTION

It is an object of the present invention to provide a Gauss type photographic lens the focusing of which can be accomplished by a simple construction.

The present invention relates to a Gauss type photographic lens comprising, in succession from the object side, a first group $G_1$ including a positive lens component, a second group $G_2$ including a positive lens and a negative lens and having a negative refractive power as a whole, a third group $G_3$ including a meniscus lens component comprising a negative lens and a positive lens cemented together and having its concave surface facing the object side, and a fourth group $G_4$ including a positive lens component, wherein some or all of the lens components in the fourth group are movable along the optical axis and focusing is accomplished only by this movable lens.

The invention will become fully apparent from the following detailed description thereof taken in conjunction with the accompanying drawings.

DESCRIPTION OF THE PREFERRED EMBODIMENTS

Figure 1A:
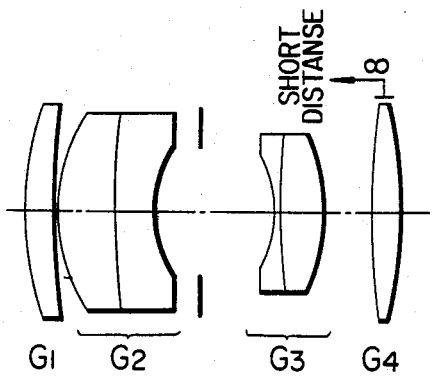
FIGS. 1(a), 2(a) and 3(a) show the lens arrangements according to a first, a second and a third embodiment of the present invention.
Figure 1B:
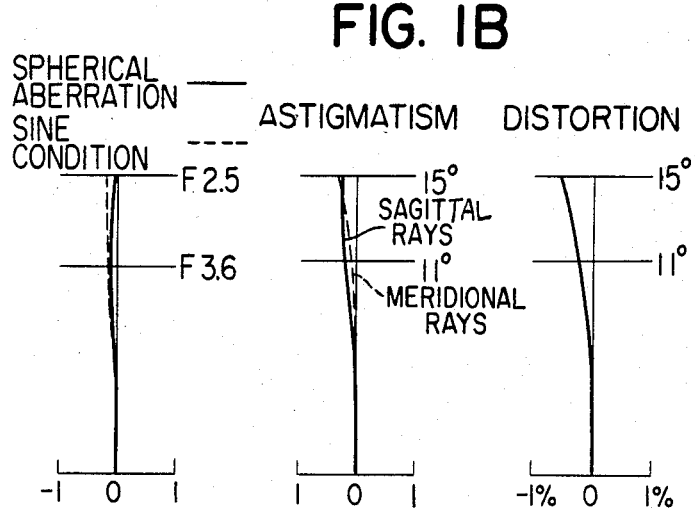
FIGS. 1(b), 2(b) and 3(b) illustrate the various aberrations in the respective embodiments with respect to an object at infinity.
Figure 1C:
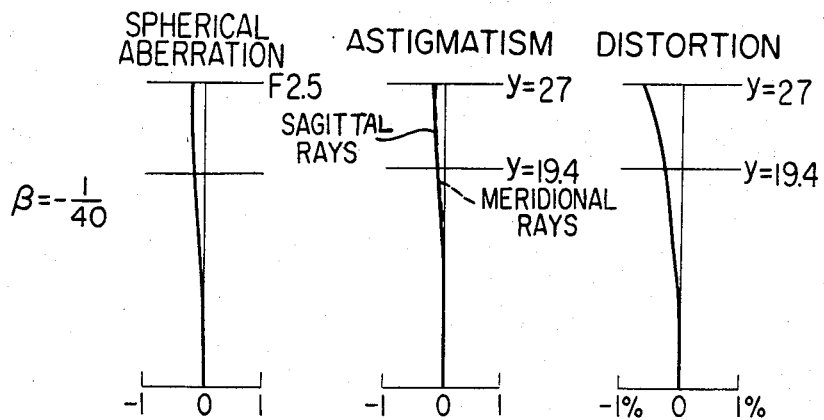
FIGS. 1(c), 2(c) and 3(c) illustrate the various aberrations in the respective embodiments with respect to an object at a short distance ($\beta = -1/40$).

A first embodiment of the present invention shown in FIG. 1(a) will hereinafter be described. The construction of the lens according to the present embodiment is what is known as a typical Gauss type photographic lens. In succession from the object side, a first group $G_1$ thereof is a positive lens component having its surface of sharper curvature facing the object side, a second group $G_2$ thereof is a negative meniscus lens component comprising a positive lens and a negative lens cemented together and having its convex surface facing the object side, a third group $G_3$ thereof is a meniscus lens component comprising a negative lens and a positive lens cemented together and having its concave surface facing the object side, and a fourth group $G_4$ is a biconvex positive lens component. A diaphragm is provided between the second group and the third group. In such a lens construction, according to the present invention, the first group $G_1$, the second group $G_2$ and the third group $G_3$ are always fixed irrespective of the object distance, namely, irrespective of the photographing magnification, and the fourth group $G_4$ is movable along the optical axis so that focusing is accomplished by the movement of only the fourth group $G_4$. Specifically, during focusing to an object at infinity, the air space between the third group $G_3$ and the fourth group $G_4$ is greatest and as the lens is focused to a short distance and the fourth group $G_4$ is moved toward the object side so that said air space becomes smaller. When the influence of the variable space between the third group $G_3$ and the fourth group $G_4$ upon aberrations is considered, it is desirable that the total focal length fa of the fixed first, second and third groups be in the range of fa > 2.0 f, where f is the total focal length of the entire system. The various aberrations in the present embodiment when focused to infinity are shown in FIG. 1B, and the various aberrations when focused to a short distance, for example in the case of a photographing magnification $\beta = -1/40$, are shown in FIG. 1C.

Figure 2A:
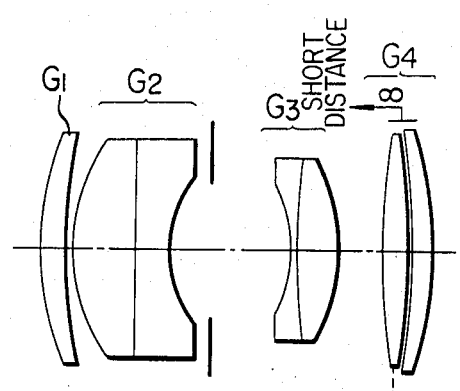
Figure 2B:
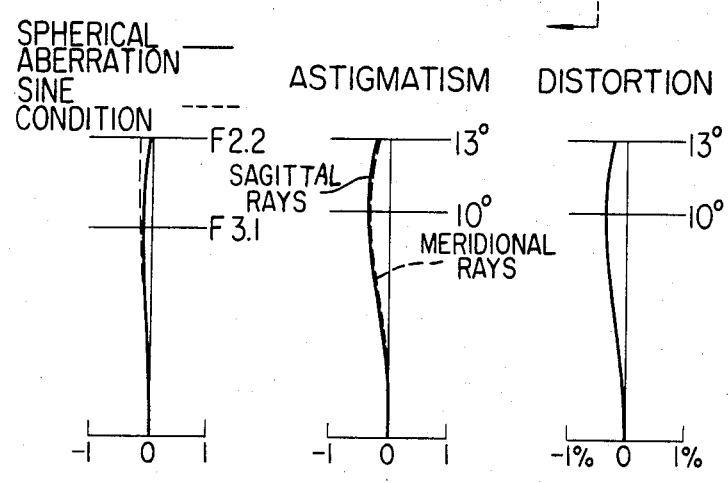
Figure 2C:
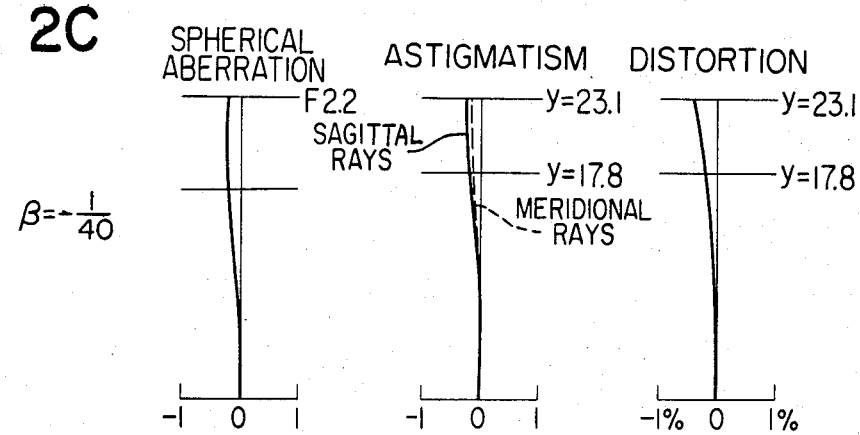

A second embodiment of the present invention, as shown in the lens arrangement of FIG. 2A, is substantially identical to the above-described first embodiment in the construction of the first group $G_1$ to the third group $G_3$, but the positive lens component of the fourth group $G_4$ is divided into a biconvex positive lens component and a positive meniscus lens component having its convex surface facing the image side. Focusing may be accomplished by the integral movement of both the positive lens component and the positive meniscus lens component. In this case, it is desirable that the total focal length fa of the first group $G_1$ to the third group $G_3$ should be fa > 1.5f. The various aberrations in the present embodiment when focused to infinity are shown in FIG. 2B, and the various aberrations when focused to a short distance, for example in the case of a photographing magnification $\beta = -1/40$, are shown in FIG. 2C.

Figure 2D:
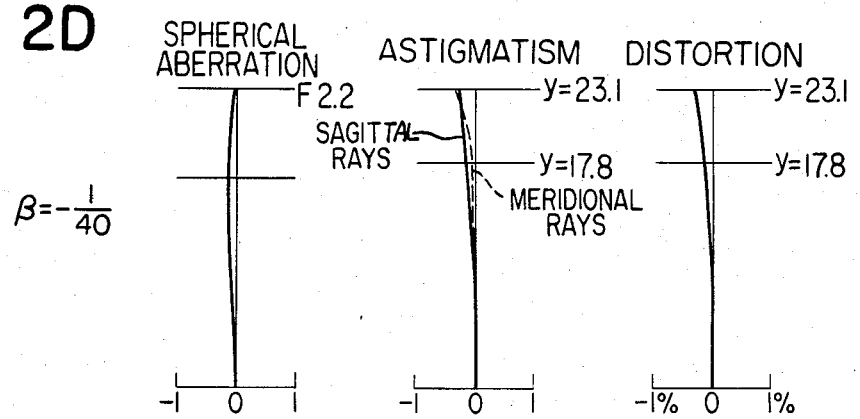
FIGS. 2(d) and 3(d) illustrate the various aberrations in the second and third embodiments with respect to an object at a short distance ($\beta = -1/40$) in the case of another focusing system according to the present invention.

In the present embodiment, focusing can also be accomplished by moving only the biconvex positive lens component in the fourth group $G_4$. This is a kind of internal focusing system and, in order to reduce the amount of movement of this movable biconvex positive lens component to thereby make the entire system more compact, it is desirable that the total focal length fb of the first group $G_1$ to this positive lens component during focusing to infinity should be in the range of f > fb > f. The various aberrations for the photographing magnification $\beta = -1/40$ in this case are shown in FIG. 2D.

Figure 3A:
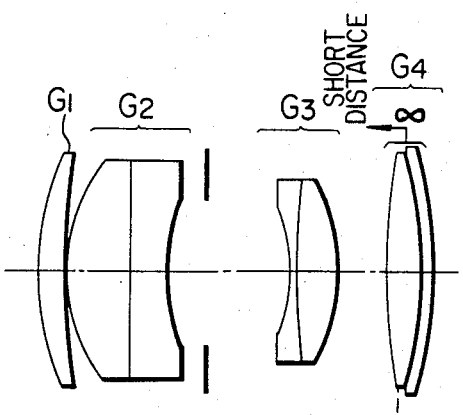
Figure 3B:
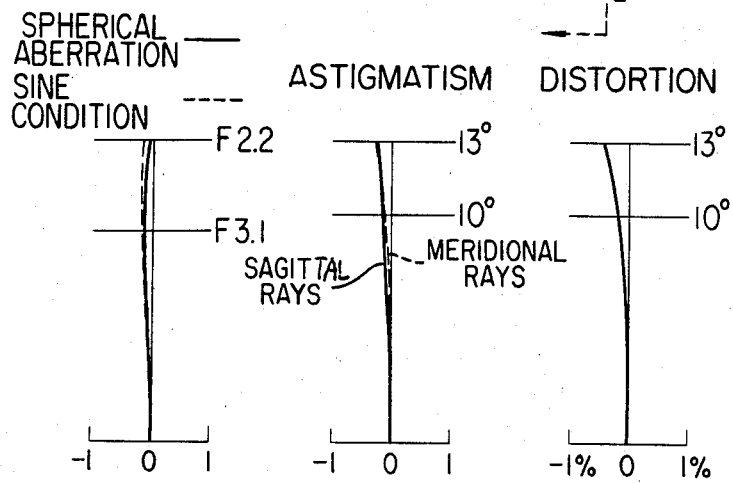
Figure 3C:
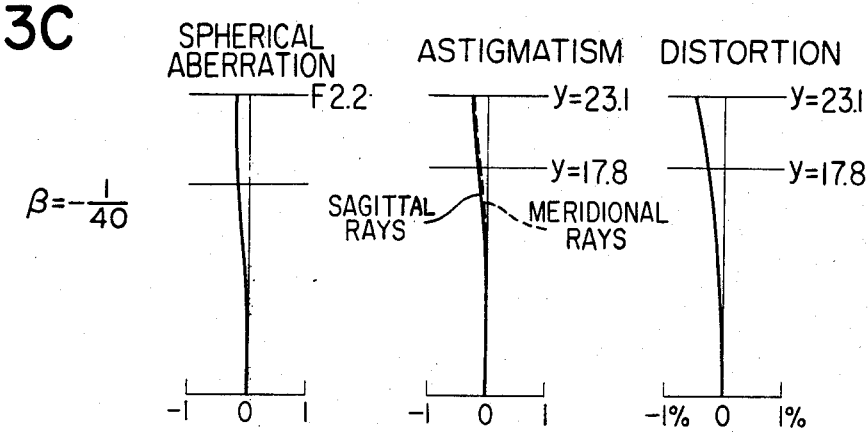

A third embodiment of the present invention, as shown in the lens arrangement of FIG. 3A, is substantially identical to the above-described first and second embodiments except for the construction of the fourth group. In the present embodiment, the single positive lens component which is the fourth group in the first embodiment is divided into a biconvex positive lens component and a negative meniscus lens component having its convex surface facing the image side and the focusing is accomplished by moving these two lens components together. In this case, it will suffice if the composite refractive power of the fourth group is only positive, but from the viewpoint of aberrations, it is desirable that the total focal length fa of the first group $G_1$ to the third group $G_3$ be $fa > 2.0f$. The various aberrations in the present embodiment when focusing to infinity, and in the case of a photographing magnification $\beta = -1/40$ are shown in FIGS. 3(b) and 3(c), respectively.

Figure 3D:
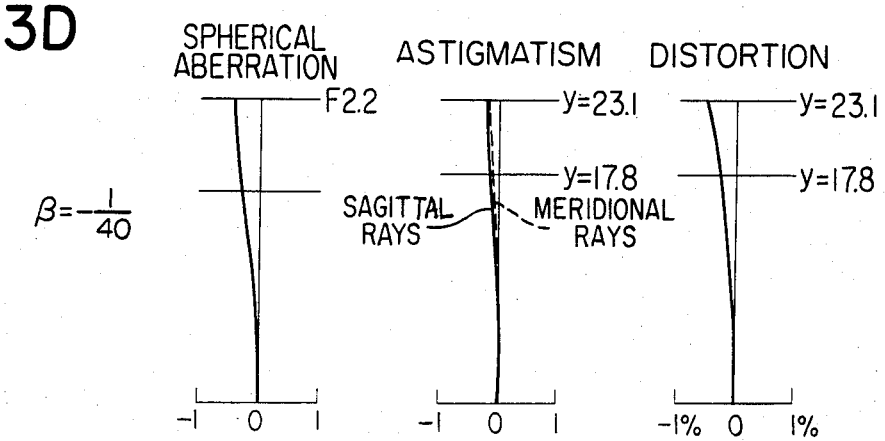

Again in the present embodiment, focusing can also be accomplished by movement of only the biconvex positive lens component in the fourth group $G_4$. In this case, it is desirable that the total focal length fb of the first group $G_1$ to this movable positive lens component during focusing to infinity should be in the range of $0.6f > fb > f$, so that the fluctuation of spherical aberration resulting from focusing can be better corrected. The various aberrations for the photographing magnification $\beta = -1/40$ in this case are shown in FIG. 3(d).

Numerical data of the various embodiments of the present invention will be shown below. In the tables below, R represents the radius of curvature of each lens surface, d represents the spacing between adjacent lens surfaces, nd and νd represent the refractive index and Abbe number, respectively, of each lens, and the subscript numbers represent the order from the object side, and fa and fb are as defined above.

First Embodiment
Total focal length f = 100.0, F-number 2.5,
Angle of view 30°

| | | | |
|---|---|---|---|
| $R_1$ = 65.13 | $d_1$ = 5.5 | $nd_1$ = 1.7481 | $vd_1$ = 52.3 |
| $R_2$ = 165.0 | $d_2$ = 0.13 | | |
| $R_3$ = 37.25 | $d_3$ = 12.5 | $nd_2$ = 1.67025 | $vd_2$ = 57.5 |
| $R_4$ = 575.0 | $d_4$ = 7.25 | $nd_3$ = 1.61293 | $vd_3$ = 36.9 |
| $R_5$ = 23.13 | $d_5$ = 25.75 | | |
| $R_6$ = −28.63 | $d_6$ = 1.88 | $nd_4$ = 1.75692 | $vd_4$ = 31.7 |
| $R_7$ = 312.5 | $d_7$ = 8.38 | $nd_5$ = 1.744 | $vd_5$ = 44.9 |
| $R_8$ = −38.88 | $d_8$ = 11.0 | | |
| $R_9$ = 218.75 | $d_9$ = 5.63 | $nd_6$ = 1.79668 | $vd_6$ = 45.4 |
| $R_{10}$ = −85.08 | | | |

Back focal length Bf = 48.35

The variable space $d_8 = 8.16$ for the photographing magnification $\beta = -1/40$.
  $fa = 272.9$ Second Embodiment
Total focal length f = 100.0, F-number 2.2,
Angle of view 26°

| | | | |
|---|---|---|---|
| $R_1$ = 65.25 | $d_1$ = 5.5 | $nd_1$ = 1.7481 | $vd_1$ = 52.3 |
| $R_2$ = 165.0 | $d_2$ = 0.13 | | |
| $R_3$ = 37.25 | $d_3$ = 12.5 | $nd_2$ = 1.67025 | $vd_2$ = 57.5 |
| $R_4$ = 625.0 | $d_4$ = 7.25 | $nd_3$ = 1.61293 | $vd_3$ = 36.9 |
| $R_5$ = 23.0 | $d_5$ = 25.63 | | |
| $R_6$ = −28.85 | $d_6$ = 1.25 | $nd_4$ = 1.75692 | $vd_4$ = 31.7 |
| $R_7$ = 312.5 | $d_7$ = 8.25 | $nd_5$ = 1.744 | $vd_5$ = 44.9 |
| $R_8$ = −39.0 | $d_8$ = 10.0 | | |
| $R_9$ = 275.0 | $d_9$ = 5.0 | $nd_6$ = 1.79668 | $vd_6$ = 45.4 |
| $R_{10}$ = −112.5 | $d_{10}$ = 0.25 | | |
| $R_{11}$ = −125.0 | $d_{11}$ = 3.75 | $nd_7$ = 1.744 | $vd_7$ = 44.9 |
| $R_{12}$ = −80.52 | | | |

Back focal length Bf = 47.83

The variable space $d_8 = 7.18$ for a photographing magnification $\beta = -1/40$.
(In the case of the focusing by only biconvex positive lens component in the fourth group, the variables spaces $d_8$ and $d_{10}$ are $d_8 = 5.89$ and $d_{10} = 4.36$ for $\beta = -1/40$.)
  $fa = 282.15$
  $fb = 117.68$ Third Embodiment
Total focal length f = 100.0, F-number 2.2,
Angle of view 26°

| | | | |
|---|---|---|---|
| $R_1$ = 65.25 | $d_1$ = 5.5 | $nd_1$ = 1.7481 | $vd_1$ = 52.3 |
| $R_2$ = 165.0 | $d_2$ = 0.13 | | |
| $R_3$ = 37.25 | $d_3$ = 12.5 | $nd_2$ = 1.67025 | $vd_2$ = 57.5 |
| $R_4$ = 625.0 | $d_4$ = 7.25 | $nd_3$ = 1.61293 | $vd_3$ = 36.9 |
| $R_5$ = 23.125 | $d_5$ = 25.88 | | |
| $R_6$ = −28.88 | $d_6$ = 1.63 | $nd_4$ = 1.75692 | $vd_4$ = 31.7 |
| $R_7$ = 312.5 | $d_7$ = 8.38 | $nd_5$ = 1.744 | $vd_5$ = 44.9 |
| $R_8$ = −39.19 | $d_8$ = 10.00 | | |
| $R_9$ = 218.75 | $d_9$ = 6.88 | $nd_6$ = 1.79668 | $vd_6$ = 45.4 |
| $R_{10}$ = −68.75 | $d_{10}$ = 0.25 | | |
| $R_{11}$ = −68.75 | $d_{11}$ = 1.88 | $nd_7$ = 1.79668 | $vd_7$ = 45.4 |
| $R_{12}$ = −83.75 | | | |

Back focal length Bf = 47.25

The variable space $d_8 = 7.16$ for a photographing magnification $\beta = -1/40$.
(In the case of the focusing by only the biconvex positive lens component in the fourth group, the variable spaces $d_8$ and $d_{10}$ are $d_8 = 7.73$ and $d_{10} = 2.52$ for $\ominus = -1/40$.)
  $fa = 274.3$
  $fb = 90.5$ According to the present invention as described above, the movement of the lens for focusing is effected only in the fourth group that is most adjacent to the image side and, therefore, focusing can be accomplished by a simple construction and the various interlocking mechanisms with the camera body are simplified, thus enhancing the operability to a higher degree.

The present invention is applicable not only to the above-described typical Gauss type photographic lens but also to a so-called modified Gauss type photographic lens in which the positive lens and the negative lens in the second group are separated from each other, and can provide a photographic lens of greater aperture ratio.

I claim:

1. A Gauss type photographic lens comprising, in succession from the object side, a first group including a positive lens component, a second group including a positive lens and a negative lens and having a negative refractive power as a whole, a third group including a meniscus lens component comprising a negative lens and a positive lens cemented together and having its concave surface facing the object side, and a fourth group including a positive lens component comprising a biconvex positive lens and a negative meniscus lens having its convex surface facing the image side, focusing being effected by movement along the optical axis of either both said biconvex positive lens and said negative meniscus lens or by movement of only said biconvex positive lens.

2. A Gauss type photographic lens comprising, in succession from the object side, a first group including a positive lens component, a second group including a positive lens and a negative lens and having a negative refractive power as a whole, a third group including a meniscus lens component comprising a negative lens and a positive lens cemented together and having its concave surface facing the object side, and a fourth group including a positive lens component movable along the optical axis, focusing being accomplished only by movement of said movable positive lens component, and wherein numerical data are as follows:

| Total focal length f = 100.0, F-number 2.5, Angle of view 30° | | | |
|---|---|---|---|
| $R_1 = 65.13$ | $d_1 = 5.5$ | $nd_1 = 1.7481$ | $vd_1 = 52.3$ |
| $R_2 = 165.0$ | $d_2 = 0.13$ | | |
| $R_3 = 37.25$ | $d_3 = 12.5$ | $nd_2 = 1.67025$ | $vd_2 = 57.5$ |
| $R_4 = 575.0$ | $d_4 = 7.25$ | $nd_3 = 1.61293$ | $vd_3 = 36.9$ |
| $R_5 = 23.13$ | $d_5 = 25.75$ | | |
| $R_6 = -28.63$ | $d_6 = 1.88$ | $nd_4 = 1.75692$ | $vd_4 = 31.7$ |
| $R_7 = 312.5$ | $d_7 = 8.38$ | $nd_5 = 1.744$ | $vd_5 = 44.9$ |
| $R_8 = -38.88$ | $d_8 = 11.0$ | | |
| $R_9 = 218.75$ | $d_9 = 5.63$ | $nd_6 = 1.79668$ | $vd_6 = 45.4$ |
| $R_{10} = -85.08$ | | | |
| Back focal length Bf = 48.35 | | | |
| fa = 272.9 | | | | wherein $d_8$ is a variable space and $d_8 = 8.16$ for a photographing magnification $\beta = -1/40$,
and wherein R represents the radius of curvature of each lens surface, d represents the spacing between adjacent lens surfaces, nd and νd represent the refractive index and Abbe number, respectively, of each lens, the subscript numbers represent the order from the object side, and fa represents the focal length of the first, second and third groups.

3. A Gauss type photographic lens comprising, in succession from the object side, a first group including a positive lens component, a second group including a positive lens and a negative lens and having a negative refractive power as a whole, a third group including a meniscus lens component comprising a negative lens and a positive lens cemented together and having its concave surface facing the object side, and a fourth group including a movable positive lens component comprising a biconvex positive lens and a positive meniscus lens having its convex surface facing the image side, focusing being effected by movement along the optical axis of either both said biconvex positive lens and said positive meniscus lens or by movement of only said biconvex positive lens, and wherein numerical data are as follows:

| Total focal length f = 100.0, F-number 2.2, Angle of view 26° | | | |
|---|---|---|---|
| $R_1 = 65.25$ | $d_1 = 5.5$ | $nd_1 = 1.7481$ | $vd_1 = 52.3$ |
| $R_2 = 165.0$ | $d_2 = 0.13$ | | |
| $R_3 = 37.25$ | $d_3 = 12.5$ | $nd_2 = 1.67025$ | $vd_2 = 57.5$ |
| $R_4 = 625.0$ | $d_4 = 7.25$ | $nd_3 = 1.61293$ | $vd_3 = 36.9$ |
| $R_5 = 23.0$ | $d_5 = 25.63$ | | |
| $R_6 = -28.85$ | $d_6 = 1.25$ | $nd_4 = 1.75692$ | $vd_4 = 31.7$ |
| $R_7 = 312.5$ | $d_7 = 8.25$ | $nd_5 = 1.744$ | $vd_5 = 44.9$ |
| $R_8 = -39.0$ | $d_8 = 10.0$ | | |
| $R_9 = 275.0$ | $d_9 = 5.0$ | $nd_6 = 1.79668$ | $vd_6 = 45.4$ |
| $R_{10} = 112.5$ | $d_{10} = 0.25$ | | |
| $R_{11} = -125.0$ | $d_{11} = 3.75$ | $nd_7 = 1.744$ | $vd_7 = 44.9$ |
| $R_{12} = -80.52$ | | | |
| Back focal length Bf = 47.83 | | | |
| fa = 282.15 | | | |
| fb = 117.68 | | | | wherein, upon focusing being effected by movement of both said biconvex positive lens and said positive meniscus lens, $d_8$ is a variable space and $d_8 = 7.18$ for a photographing magnification $\beta = -1/40$, and wherein, upon focusing being effected by movement of only said biconvex positive lens, $d_8$ and $d_{10}$ are variables spaces and $d_8 = 5.89$ and $d_{10} = 4.36$ for $\beta = -1/40$, and wherein R represents the radius of curvature of each lens surface, d represents the spacing between adjacent lens surfaces, nd and νd represent the refractive index and Abbe number, respectively, of each lens, the subscript numbers represent the order from the object side, fa represents the focal length of the first to the third groups, and fb represents the focal length of the first group to the movable positive lens component.

4. A Gauss type photographic lens comprising, in succession from the object side, a first group including a positive lens component, a second group including a positive lens and a negative lens and having a negative refractive power as a whole, a third group including a meniscus lens component comprising a negative lens and a positive lens cemented together and having its concave surface facing the object side, and a fourth group including a movable positive lens component comprising a biconvex positive lens and a negative meniscus lens having its convex surface facing the image side, focusing being effected by movement along the optical axis of either both said biconvex positive lens and said negative meniscus lens or by movement of only said biconvex positive lens, and wherein numerical data are as follows:

| Total focal length f = 100.0, F-number 2.2, Angle of view 26° | | | |
|---|---|---|---|
| $R_1 = 65.25$ | $d_1 = 5.5$ | $nd_1 = 1.7481$ | $vd_1 = 52.3$ |
| $R_2 = 165.0$ | $d_2 = 0.13$ | | |
| $R_3 = 37.25$ | $d_3 = 12.5$ | $nd_2 = 1.67025$ | $vd_2 = 57.5$ |
| $R_4 = 625.0$ | $d_4 = 7.25$ | $nd_3 = 1.61293$ | $vd_3 = 36.9$ |
| $R_5 = 23.125$ | $d_5 = 25.88$ | | |
| $R_6 = -28.88$ | $d_6 = 1.63$ | $nd_4 = 1.75692$ | $vd_4 = 31.7$ |
| $R_7 = 312.5$ | $d_7 = 8.38$ | $nd_5 = 1.744$ | $vd_5 = 44.9$ |
| $R_8 = -39.19$ | $d_8 = 10.00$ | | |
| $R_9 = 218.75$ | $d_9 = 6.88$ | $nd_6 = 1.79668$ | $vd_6 = 45.4$ |
| $R_{10} = -68.75$ | $d_{10} = 0.25$ | | |
| $R_{11} = -68.75$ | $d_{11} = 1.88$ | $nd_7 = 1.79668$ | $vd_7 = 45.4$ |
| $R_{12} = -83.75$ | | | |
| Back focal length Bf = 47.25 | | | |
| fa = 274.3 | | | |
| fb = 90.5 | | | | wherein, upon focusing being effected by movement of both said biconvex positive lens and said negative meniscus lens, $d_8$ is a variable space and $d_8 = 7.16$ for a photographing magnification $\beta = -1/40$, and wherein, upon focusing being effected by movement of only said biconvex positive lens, $d_8$ and $d_{10}$ are variables spaces and $d_8 = 7.73$ and $d_{10} = 2.52$ for $\beta = -1/40$, and wherein R represents the radius of curvature of each lens surface, d represents the spacing between adjacent lens surfaces, nd and νd represent the refractive index and Abbe number, respectively, of each lens, the subscript numbers represent the order from the object side, fa represents the focal length of the first to the third groups, and fb represents the focal length of the first group to the movable positive lens component.

5. A Gauss type photographic lens comprising, in succession from the object side, a first group including a positive lens component, a second group including a positive lens and a negative lens and having a negative refractive power as a whole, a third group including a meniscus lens component comprising a negative lens and a positive lens cemented together and having its concave surface facing the object side, and a fourth group comprising a biconvex positive lens and a meniscus lens having its convex surface facing the image side, focusing being effected by movement along the optical axis of either both said biconvex positive lens and said meniscus lens or by movement of only said biconvex positive lens.

* * * * *